Patented July 5, 1938

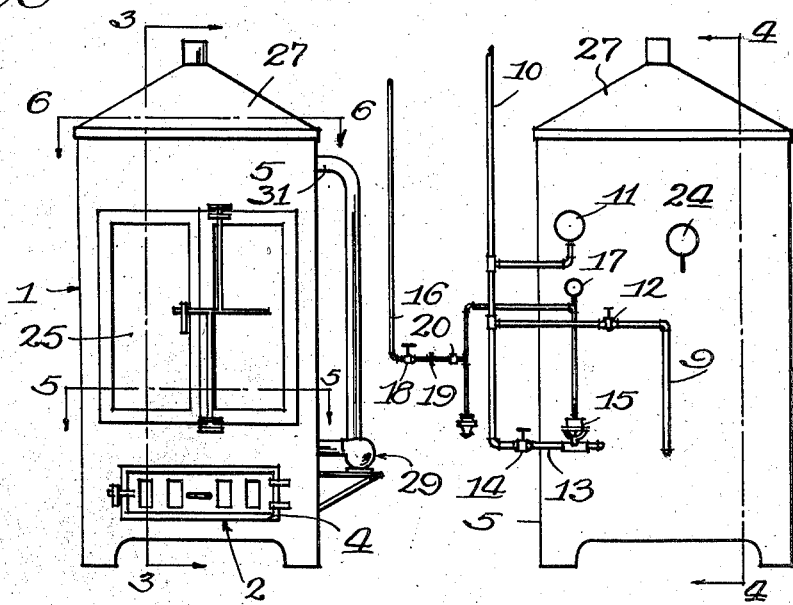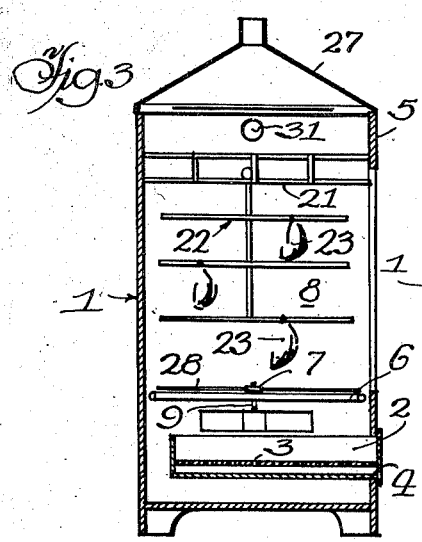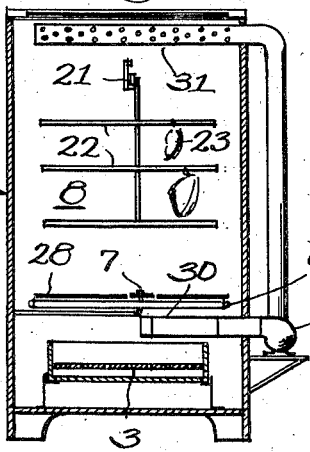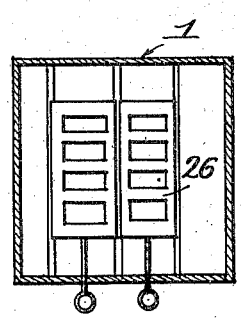

2,123,040

UNITED STATES PATENT OFFICE 2,123,040

SMOKER AND STEAM VAPOR COOKER FOR HAMS AND OTHER MEATS AND MEAT PRODUCTS

Benjamin B. Hanak, Chicago, Ill.

Application January 22, 1937, Serial No. 121,831

1 Claim. (Cl. 53—15)

The present invention relates to a smoker and steam vapor cooker and more in particular to a novel construction and means of smoking and cooking hams and/or other meats or meat products.

In preparing hams for the steps of smoking and curing, they are preferably pickled in a brine for a period of approximately thirty days, depending somewhat upon the size of the ham, after which they are pulled and drained for a period of substantially fifteen days which gives a thoroughly mild cure. Thereafter and before the hams are smoked, they are preferably soaked in luke warm water for a period of approximately two hours, after which they are placed on smoke sticks and hung in the chamber or compartment where they are dried and later smoked and cooked.

The present invention comprehends a chamber or compartment equipped with heating means such as steam pipes for raising the temperature therein so as to properly dry the hams at the desired degree. After the hams are so dried, they are smoked for a period of approximately two to three hours or to the point where the smoke thoroughly and adequately permeates the entire ham and gives it the proper color. Next the smoke producing apparatus is removed, the entire chamber or compartment made substantially airtight and a spray of steam is projected into the chamber and the hams cooked for a period of approximately twenty to thirty hours, depending upon the size of the ham. This slow method of cooking thoroughly tenderizes the hams and retains the bones and marrow and gives them a flavor far superior to that secured by cooking in water or otherwise.

A further object of the present invention is the provision of a novel means of smoking and cooking hams and/or other meats or meat products and thereby improve their quality.

Another object is to provide a novel device for cooking hams, etc. and in which a steam spray is ejected into a sealed and heated chamber in which the hams are hung, as distinguished from cooking the hams in water. By the present novel means and method, the hams are not subject to shrinkage and loss in weight, while the flavor and texture of the meat is greatly improved.

A still further object of the present invention is the provision of a novel means of circulating the heated air and vapor in the cooking compartment or chamber and thereby accelerating the rate of and time necessary for a thorough cooking.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Fig. 1 is a view in front elevation and Fig. 2 is a view in side elevation of the novel device;

Fig. 3 is a view in vertical cross section through the construction disclosed in Fig. 1 taken on the line 3—3 of Fig. 1;

Fig. 4 is a fragmentary view in vertical cross section through the device and taken on the line 4—4 of Fig. 2;

Figs. 5 and 6 are views in horizontal cross section through the novel smoker and steam vapor cooker, taken on the lines 5—5 and 6—6, respectively, of Fig. 1.

Referring more particularly to the disclosure in the drawing, the novel construction of smoker and steam vapor cooker consists of a box or casing 1 having mounted therein a firebox or smoke producing apparatus 2 provided with a grate 3 suitably perforated to permit a draft therethrough. The fire is generally formed from hickory, charcoal and/or other ingredients which are laid on the perforated plate in the base or lower part of the casing and the firebox is preferably insertable into and removable through an opening 4 in the front 5 of the casing and adapted to be closed by means of a steel plate or other closure so as to tightly enclose and seal this end of the device.

Mounted above the firebox or smoke producing apparatus are a plurality of steam pipes or heat producing means 6, and also connected to the steam line is a spray nozzle 7 which cracks the steam to a fine spray as it issues into the heated compartment or chamber 8 for humidifying the atmosphere therein. This spray is shown connected to a pipe or conduit 9 which leads to the exterior and to a steam line 10 provided with a pressure gauge 11 and a valve 12 controlling the flow of steam to the spray head or nozzle. The steam line further leads to a conduit or pipe 13 which supplies steam to the heating coils 6 and in which line is mounted a steam valve 14 and a thermostat 15. An air line 16 is also provided and suitably connected to a pressure gauge 17. In this air line is located a valve 18 to control the air to the thermostat 15, a filter 19 and a reducing valve 20 leading to the thermostat 15 regulating the steam valve 14 for the steam entering the coils.

Also within the chamber is mounted one or more tracks 21 adapted to receive and slidably mount suitable smoke sticks and/or racks 22 upon which the hams 23 are hung during their smoking and cooking treatment. In order to accurately gauge the temperature in the compartment or chamber, the invention comprehends the provision of a recording thermometer 24 which at all times accurately discloses to the operator the temperature within the device.

In the treatment of the hams, they are hung upon the smoke sticks 22 after they have been pickled in brine for the desired period, drained and soaked in luke warm water prior to the hams being placed in the smoker and steam vapor cooker. The smoke sticks are mounted on the track or tracks within the compartment. The closure or door 25 is then closed and locked and the hams are dried at a temperature of approximately 120° to 130°. Thereafter the smoke apparatus is operated. After the ham has been smoked for a period of two to three hours or to the point that the smoke thoroughly permeates through the ham and the ham takes on a golden color, the smoke pan or firebox 2 is removed and a steel plate or closure is then tightly screwed or clamped into position to close the opening. At such time the adjustable damper or dampers 26 within the dome or head 27 are closed off to prevent discharge to the stack and the casing is otherwise sealed to the outside atmosphere so as to form an air-tight chamber. The interior is then heated by the steam coils and steam is then ejected through the nozzle 7 into the chamber in the form of a fine spray to humidify the atmosphere therein and the hams are thoroughly cooked and tenderized within the heated chamber. Any grease exuded or dripping from the hams will be caught upon the plate 28.

By reason of my novel slow method of cooking, I secure a uniform product. The time of cooking and temperature within the chamber are accurately regulated, the critical temperature depending however upon the size and texture of the hams to be cooked. I have secured excellent results by heating the air within the chamber to approximately 165° F. at the start of the cooking operation, and increasing this to approximately 175° F. at the end of the cook. I have also found that hams cooked by the present process, when reaching an inner temperature of approximately 150° to 153° F., are completely and uniformly cooked.

In most instances, it is desirable during this cooking operation that there be a circulation and recirculation of the heated air through the chamber. This is accomplished by means of a circulating fan 29 having an inlet or intake 30 and an exhaust or discharge 31 at the top of the chamber. This exhaust is preferably in the form of a perforated pipe extending substantially completely across the chamber while the intake is at the bottom of the chamber and is preferably funnel-shaped. This circulating system may also be employed to circulate and recirculate the smoke through the chamber, if desired.

In order to prevent the building up and hardening of creosote around the walls and/or other portions of the chamber incident to combustion during the smoking operation, the invention comprehends the employment of a light or neutral oil which is spread over or wiped upon the interior of the chamber and structure therein. Thus any creosote collecting upon the interior may be readily wiped off or removed. This neutral oil is tasteless and has no effect upon the hams.

Although I have related above a method of preparing the hams prior to the smoking and cooking operations, and which preliminary treatment requires a considerable length of time, I have found by my slow method of cooking, these periods may be expedited.

It will be readily appreciated from the above description and from the disclosure in the drawing, that the novel invention comprises a means and method of smoking and cooking hams which is far superior to those now in use and one which tenderizes the hams and improves their quality and flavor.

Having thus disclosed the invention, I claim:

A combined unit for smoking and cooking hams and the like, comprising a chamber for receiving the hams and retaining them during the smoking and cooking operations, a firebox removably mounted in the base of the unit below the hams and adapted to be removed after the smoking operation, a closure adapted to replace the firebox and close the base of the unit and seal it to the outside atmosphere, heating coils in the chamber for heating the interior of the unit, a spray nozzle located below the hams for projecting a fine spray of steam into the chamber to humidify and diffuse the atmosphere and circulating means causing a circulation and recirculation of the humidified atmosphere during the cooking operation.

BENJAMIN B. HANAK.